(12) United States Patent
Bielesch

(10) Patent No.: US 9,682,592 B2
(45) Date of Patent: Jun. 20, 2017

(54) LIGHT CONTROL FILM FORMED WITH A SECURITY FEATURE

(71) Applicant: ENTRUST DATACARD CORPORATION, Shakopee, MN (US)

(72) Inventor: Ulrich Bielesch, Frücht (DE)

(73) Assignee: ENTRUST DATACARD CORPORATION, Shakoppe, MN (US)

( * ) Notice: Subject to any disclaimer, the term of this patent is extended or adjusted under 35 U.S.C. 154(b) by 173 days.

(21) Appl. No.: 14/431,502

(22) PCT Filed: Feb. 1, 2013

(86) PCT No.: PCT/US2013/024329
§ 371 (c)(1),
(2) Date: Mar. 26, 2015

(87) PCT Pub. No.: WO2014/051659
PCT Pub. Date: Apr. 3, 2014

(65) Prior Publication Data

US 2015/0246571 A1   Sep. 3, 2015
US 2017/0028761 A9   Feb. 2, 2017

(30) Foreign Application Priority Data

Sep. 26, 2012 (DE) .................. 10 2012 109 064

(51) Int. Cl.
*B42D 25/435* (2014.01)
*B42D 25/00* (2014.01)
(Continued)

(52) U.S. Cl.
CPC .............. *B42D 25/30* (2014.10); *B23K 26/08* (2013.01); *B23K 26/36* (2013.01); *B23K 26/402* (2013.01);
(Continued)

(58) Field of Classification Search
CPC Y10S 283/901; Y10S 283/902; B42D 25/435
(Continued)

(56) References Cited

U.S. PATENT DOCUMENTS 4,765,656 A   8/1988  Becker et al.
4,892,336 A   1/1990  Kaule et al.
(Continued)

FOREIGN PATENT DOCUMENTS

CN   1114532   7/2003
CN   102027394   4/2011
(Continued)

OTHER PUBLICATIONS

Office Action of Chinese application No. 201380049778.5, dated Sep. 2, 2016, total 10 pages.
(Continued)

*Primary Examiner* — Kyle Grabowski
(74) *Attorney, Agent, or Firm* — Hamre, Schumann, Mueller & Larson, P.C.

(57) ABSTRACT

A light control film is described that is formed with at least one security feature therein. The security feature is not visible when the film is viewed at an incorrect angle. The security feature only becomes visible when the film is viewed at the correct viewing angle or range of viewing angles. A plurality of security features can be formed in the film at substantially the same location(s), but at different angles, so that each security feature only becomes visible when the film is viewed at the correct respective viewing angle or range of viewing angles. The light control film can be integrated into any type of document where resistance to counterfeiting and fraudulent alteration are important, such as plastic identification or credit cards, or passports.

15 Claims, 6 Drawing Sheets

(51) Int. Cl.
| | |
|---|---|
| *B42D 25/30* | (2014.01) |
| *B42D 25/309* | (2014.01) |
| *G02B 27/46* | (2006.01) |
| *B42D 25/41* | (2014.01) |
| *B42D 25/29* | (2014.01) |
| *B42D 25/40* | (2014.01) |
| *B23K 26/08* | (2014.01) |
| *B23K 26/36* | (2014.01) |
| *G02B 5/02* | (2006.01) |
| *B23K 26/402* | (2014.01) |
| *G02B 17/00* | (2006.01) |
| *G02B 5/00* | (2006.01) |

(52) U.S. Cl.
  CPC ............ *B42D 25/00* (2014.10); *B42D 25/29* (2014.10); *B42D 25/309* (2014.10); *B42D 25/40* (2014.10); *B42D 25/41* (2014.10); *B42D 25/435* (2014.10); *G02B 5/0231* (2013.01); *G02B 27/46* (2013.01); *B42D 2035/36* (2013.01); *G02B 5/003* (2013.01); *G02B 17/006* (2013.01)

(58) Field of Classification Search
  USPC .................................................. 283/901, 902
  See application file for complete search history.

(56) References Cited

U.S. PATENT DOCUMENTS

| | | | | |
|---|---|---|---|---|
| 5,104,210 | A * | 4/1992 | Tokas | G02B 5/00 359/296 |
| 5,735,547 | A * | 4/1998 | Morelle | B42D 25/29 283/902 |
| 6,328,342 | B1 * | 12/2001 | Belousov | B42D 25/00 283/95 |
| 6,786,513 | B1 * | 9/2004 | Cobben | B42D 25/43 283/105 |
| 7,196,781 | B2 | 3/2007 | Kreuter | |
| 8,256,683 | B2 * | 9/2012 | Von Fellenberg | B42D 25/29 235/489 |
| 2008/0186558 | A1 | 8/2008 | Lee et al. | |
| 2009/0284836 | A1 * | 11/2009 | Boyd | G02B 5/003 283/902 |
| 2010/0201242 | A1 | 8/2010 | Liu et al. | |
| 2011/0037247 | A1 | 2/2011 | Gielen | |

FOREIGN PATENT DOCUMENTS

| | | |
|---|---|---|
| DE | 102006021961 | 11/2007 |
| JP | 2003-019884 | 1/2003 |
| JP | 2006-43978 | 2/2006 |
| JP | 2006-224476 | 8/2006 |
| WO | 00-43216 | 7/2000 |
| WO | 2006-110038 | 10/2006 |
| WO | 2006-137738 | 12/2006 |
| WO | 2010-090924 | 8/2010 |
| WO | 2011-122943 | 10/2011 |

OTHER PUBLICATIONS

The Extended European Search Report of European Application No. 13840831.5, issued Jul. 8, 2016, 6 pages.
International Search Report and Written Opinion for International Application No. PCT/US2013/024329, dated Jun. 2, 2013, 11 pgs.

* cited by examiner

LIGHT CONTROL FILM FORMED WITH A SECURITY FEATURE

FIELD

This disclosure relates to a light control film, also known as a light collimating film or a visual protection foil, formed with at least one security feature, and to an identification document that includes such a light control film.

BACKGROUND

The construction and operation of light control films, also known as light collimating films or visual protection foils, is well known. Light control films are used to regulate the directionality of transmitted light. For example, see WO2010/090924 and US2010/0201242. These films have a plurality of parallel grooves or light control structures, which are formed of alternating structures of light absorbing material and light transmitting material, so that depending on the orientation of the grooves, the pitch and the geometry, the films provide a maximum light transmission at a predefined angle and an image cut off or black out for angles different from the predefined angle. When the film is viewed at a first viewing angle, light is transmitted through the film allowing one to see substantially unobstructed through the film so that the film appears to be substantially transparent. However, when the film is viewed at a second viewing angle, light is blocked and the film appears dark, thereby preventing seeing through the film.

Identification documents such as identification cards, credit and debit cards, driver's licenses, and the like, and passports, are personalized with information concerning the intended holder of the identification document and then issued to the intended holder. Personalization and issuance are typically handled by government agencies, credit card companies, or other entities authorized to handle the personalization and issuance process.

As part of the personalization and issuance process, the identification documents can undergo a number of personalization procedures, including printing, portrait printing, magnetic stripe and/or chip encoding, embossing, lamination of protective laminates, and other known procedures.

A number of security measures have been implemented in order to resist counterfeiting, forgery or tampering with identification documents.

One technique uses laser engraving because of the advantage that the information can be written inside the document layers using the laser, so that the information cannot be removed, modified, or replaced from the surface like printing. With laser engraving, the document must consist of appropriate material, which reacts in the designated way to the laser.

In order to avoid copying and direct printing, one known security feature uses a lens structure on the top surface, and the laser beam transmits through the lens structure and engraves the layer underneath so that several different images can be placed at the same area visible under different angles. This approach is described in U.S. Pat. No. 4,765,656, U.S. Pat. No. 4,892,336, and WO 2006/137738. Following this approach, several images can be engraved underneath the lens structure, which join together to form one image with a three dimensional appearance, as disclosed in WO 2006/110038 and WO 2011/122943.

Another security feature as described in U.S. Pat. No. 6,786,513 is visible from both sides of the document so that a falsification by modifying the surface can easily be detected. The feature uses a laser to form micro holes with different sizes into the document. The generated perforation pattern is visible when viewed against a bright background. This feature involves the complete thickness of the document including all layers. The drilled holes perforate the surface of the document so that the document gets susceptible to soiling. In addition, conventional drilling machines with needle sized drilling bits may be able to imitate the feature.

An example of a previous security feature that is ablated into a foil is disclosed in U.S. Patent Application Publication US 2011/0037247.

Further improvements to security measures to resist counterfeiting, forgery or tampering with identification documents, as well as resist fraudulent use of identification documents once issued, are needed.

SUMMARY

A light control film is described that is formed with at least one security feature therein. The security feature is not visible when the film is viewed at an incorrect angle. The security feature only becomes visible when the film is viewed at the correct viewing angle or range of viewing angles.

A plurality of security features can be formed in the film at substantially the same location(s), but at different angles from one another, so that each security feature only becomes visible when the film is viewed at the correct viewing angle(s) generally corresponding to the angle at which the respective security feature was formed. The film otherwise appears generally transparent or translucent when the film is viewed at a primary viewing angle or dark when viewed at an incorrect viewing angle.

In one embodiment, the light control film can be integrated into any type of document where resistance to counterfeiting and fraudulent alteration are important. Examples of documents that can employ the light control film described herein include, but are not limited to, identification documents such as cards or passports, security documents, stock certificates, property titles, and paper currency. Specific examples of cards include, but are not limited to, national or state identification cards, driver's licenses, health care identification cards, and credit or debit cards.

A laser that is deployed at a particular angle to the film is used to locally destroy micro light control structures within the film to create the security feature. The resulting security feature is visible only when the film is viewed at the correct viewing angle or range of viewing angles. The laser created security feature appears bright against a dark background of the circumjacent film when the film with the security feature is tilted to the appropriate angle. To create a second security feature, the laser can be deployed at a second angle to the film. The resulting second security feature is visible only when the film is viewed at a correct viewing angle or range of angles.

The security feature(s) can be any feature(s) that is provided to resist counterfeiting and fraudulent alteration of the film or any document into which the film is incorporated. In one embodiment, the security feature can be personal to a person, such as some portion or all of the person's image, name, birth date, social security number, a signature, an address, an assigned account number, any other personal data of the person, and any combination thereof. In another embodiment, the security feature is not personal to a person, but is instead a static feature that is used on multiple films. One example of a static security feature includes, but is not limited to, a corporate logo or corporate name. In another embodiment, the security feature is variable but based on non-personal information, such as the date of creation of the security feature in the film. The film can include any number of, and combinations of, these types of security features, as well as other features produced via a laser.

In one embodiment, a light control film having a plurality of micro light control structures formed in the film is provided, and a first security feature is formed in the micro light control structures. The light control film is generally transparent or translucent at a primary viewing angle, the first security feature is not visible when the light control film is viewed at a first viewing angle, and the first security feature is visible when the light control film is viewed at a correct viewing angle or range of viewing angles.

In another embodiment, the first security feature is formed in the micro light control structures at an angle that is different than the first viewing angle, and the correct viewing angle or range of viewing angles is approximately equal to the angle at which the first security feature is formed in the micro light control structures.

In another embodiment, a second security feature is formed in the micro light control structures located generally in the same area and/or adjacent to the first security feature, wherein the film is generally transparent or translucent at a primary viewing angle, and the second security feature is not visible when the light control film is viewed at the first viewing angle, and the second security feature is visible when the light control film is viewed at a correct viewing angle or range of viewing angles. The correct viewing angle or range of viewing angles for viewing the second security feature can be different than or the same as the correct viewing angle or range of viewing angles for viewing the first security feature.

In another embodiment, the second security feature is formed in the micro light control structures at an angle, and wherein the correct viewing angle or range of viewing angles for viewing the second security feature is approximately equal to the angle at which the second security feature is formed in the micro light control structures.

In an embodiment, the correct viewing angle or range of viewing angles is accomplished by rotating the light control film around an axis perpendicular to the surface of the light control film.

In another embodiment the first security feature is formed in the micro light control structures at an angle that is different than the first viewing angle, wherein the light control film is generally transparent or translucent at a primary viewing angle and the first security feature is not visible when the light control film is viewed at a first viewing angle. The security feature is visible in front of a dark background with illumination of the rear side under an appropriate viewing angle or range of viewing angles. The laser created security feature appears bright against a dark background caused by light scattering of the illumination at the position where the laser beam that forms the first security feature contacts the micro light control structures destroyed thereby.

In another embodiment a second security feature is formed in the micro light control structures located in the same area and/or adjacent to the first security feature, wherein the film is generally transparent or translucent at the primary viewing angle, the second security feature is not visible when the light control film is viewed at the first viewing angle, and the second security feature is visible when the light control film is viewed in front of a dark background with illumination of the rear side by rotating the light control film around an axis perpendicular to the surface under a similar viewing angle or range of viewing angles at which the first security feature is visible. The second laser created security feature appears bright against a dark background caused by light scattering of the illumination at the position where the laser beam that forms the second security feature contacts the micro light control structures destroyed thereby.

In another embodiment, a document that includes the light control film of the proceeding paragraphs is provided.

In one embodiment, the document can be a plastic card or a passport.

In one embodiment, the document includes a first generally transparent or translucent layer overlying a first side of the light control film, and a generally transparent or translucent layer overlying a second side of the light control film.

In one embodiment, the document includes a first generally transparent or translucent layer overlying a first side of the light control film, and a nontransparent/nontranslucent reflecting or white layer overlying a second side of the light control film.

In another embodiment, the first security feature comprises a portrait image, text data, or a logo.

In another embodiment, a method of creating a security feature in a light control film having a plurality of micro light control structures formed in the film is provided. The light control film is generally transparent or translucent when the light control film is viewed at a primary viewing angle. In the method, a laser beam is used to destroy portions of the micro light control structures to form a first security feature. The light control film remains generally transparent or translucent at the primary viewing angle, and the first security feature is not visible when the light control film is viewed at a first viewing angle, and the first security feature is visible when the light control film is viewed at a correct viewing angle or range of viewing angles.

In another embodiment of the method, the laser beam contacts the micro light control structures destroyed thereby at an angle that is different than the first viewing angle, and the correct viewing angle or range of viewing angles is approximately equal to the angle at which the laser beam contacts the micro light control structures destroyed thereby.

In another embodiment of the method, a laser beam is used to destroy portions of the micro light control structures to form a second security feature located in generally the same area and/or adjacent to the first security feature. The light control film remains generally transparent or translucent at the primary viewing angle, the second security feature is not visible when the light control film is viewed at the first viewing angle, and the second security feature is visible when the light control film is viewed at a correct viewing angle or range of viewing angles. The correct viewing angle or range of viewing angles for viewing the second security feature can be the same as or different than the correct viewing angle or range of viewing angles for viewing the first security feature.

In another embodiment of the method, the laser beam that forms the second security feature contacts the micro light control structures destroyed thereby at an angle that is different than the first viewing angle, and the correct viewing angle or range of viewing angles for viewing the second security feature is approximately equal to the angle at which the laser beam that forms the second security feature contacts the micro light control structures destroyed thereby.

In another embodiment of the method, the light control film is incorporated in a document.

In an embodiment of the method, the document can be a plastic card or a passport.

In an embodiment of the method, the first security feature comprises a portrait image, text data, or a logo.

The security feature in the light control film is not visible to standard photocopiers or scanners, thereby resisting counterfeiting and fraudulent alteration based on photocopying and scanning. Further, visible inspection of the security feature does not require special tools or devices. No lens structure on the film is required as is required for CLI/MLI technology. In addition, a standard laser mechanism used to perform laser personalization on documents can be used to produce the security feature in the film.

DRAWINGS

DETAILED DESCRIPTION

Figure 1:
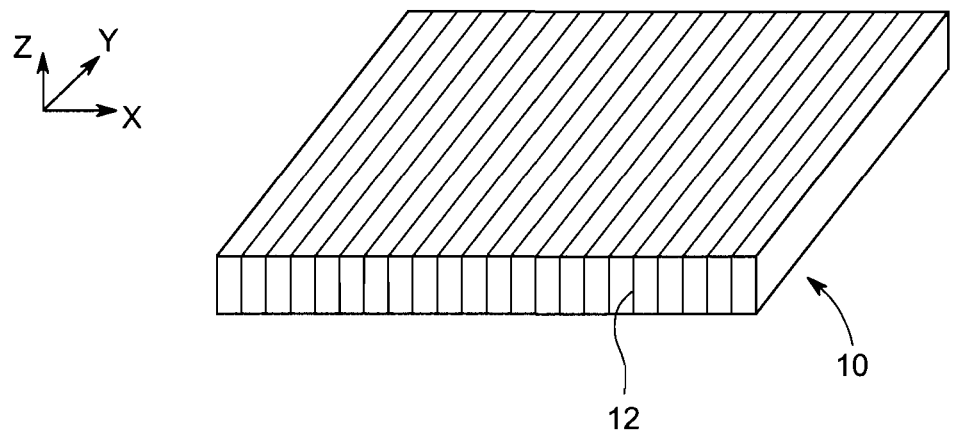
FIG. 1 is a perspective view of one example of a light control film.
Figure 2:
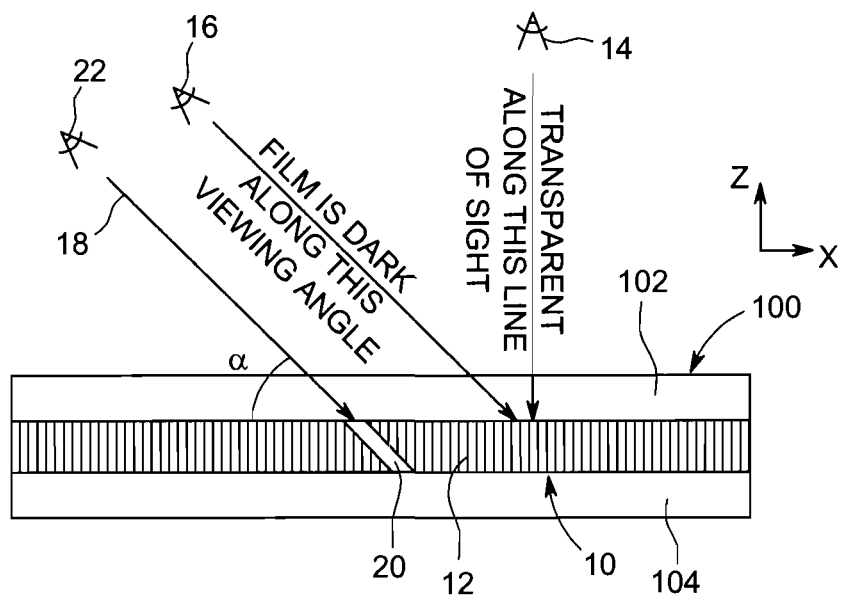
FIG. 2 is a cross-sectional view of the light control film of FIG. 1, with a security feature formed therein and incorporated into an identification document.

Referring initially to FIGS. 1 and 2, a light control film 10 is illustrated. The thickness of the film 10 has been greatly exaggerated in FIGS. 1 and 2 in order to help explain the concepts. The general construction and operation of a light control film, also known as a visual protection foil, is well known in the art. The film 10 is a generally planar structure with a plurality of micro light control structures or walls 12. As used herein, the term "micro" is intended to mean structures that are very small and not visible to the naked eye. The structures can be, but are not required to be, micron in size (one millionth ($10^{-6}$) of a meter). Examples of suitable light control films that can be used include, but are not limited to, BSF33.8 Vikuiti™ available from 3M Corporation of St. Paul, Minn., USA or PS14.1 WA2 available from V7/Ingram Micro Inc. of Santa Ana, Calif., USA.

In the example illustrated in FIGS. 1 and 2, the structures 12 are linear structures that extend from one end of the film to the opposite end parallel to one another in the y-direction and extend the thickness of the film parallel to the z-direction. As indicated in FIG. 2, when the typical film 10 is viewed along a viewing direction or primary viewing angle 14 perpendicular to the x-y plane of the film, the film appears to be generally transparent or translucent. In addition, when the typical film is viewed along a viewing direction 16 or viewing angle that is at an angle to the x-y plane of the film, the film appears to be dark. This construction and operation of the film 10 is conventional.

As depicted in FIG. 2, the film 10 is made to differ from the conventional film in that a laser is used to create one or more security features within the film. Each security feature is created by using a laser beam 18 that can be deployed at a respective angle $\alpha$ to the x-y plane of the film to locally change the characteristics of the film 10 by locally destroying the structures 12 as indicated at the location 20 in FIG. 2.

When two or more security features are created, a first security feature is created at an angle $\alpha 1$, a second security feature is created at an angle $\alpha 2$ that is different than $\alpha 1$, a third security feature is created at an angle $\alpha 3$ that is different than $\alpha 1$ and $\alpha 2$, etc. Each security feature is visible when the film is viewed along a direction or correct viewing angle 22 (or range of viewing angles discussed further below) that is substantially equal to the angles $\alpha 1$, $\alpha 2$, $\alpha 3$, etc. at which the laser was deployed.

In reality, each security feature can be visible over a respective range of viewing angles $\pm \alpha$ near $\alpha 1$, $\alpha 2$, $\alpha 3$ depending upon the angle of incident light. So as used herein, reference to a security feature being visible at a correct viewing angle includes the security feature being visible at a single, main viewing angle as well as being visible over a range of viewing angles near the single, main viewing angle.

Figure 3:
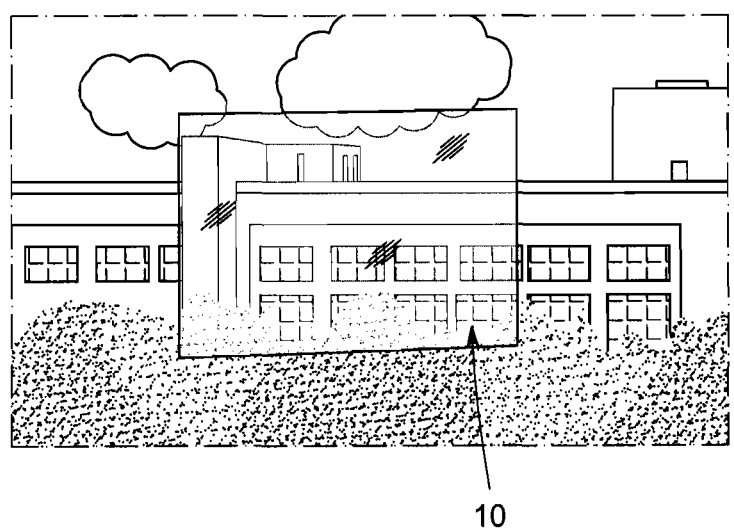
FIG. 3 is a view of the light control film perpendicular to the plane of the film with a pair of security features formed therein.

Therefore, a plurality of security features can be created at generally the same or adjacent locations in the film 10 but at different angles. This effect is demonstrated by referring to FIGS. 3-5. FIG. 3 illustrates the view through the film 10 that has been modified to include a pair of security features at generally the same location on the film using a laser as discussed above. In FIG. 3, the primary viewing angle is perpendicular to the x-y plane of the film (i.e. along viewing direction 14 in FIG. 2) so that the entire film appears to be generally transparent or translucent and one can see through the film as with the standard film.

Figure 4:
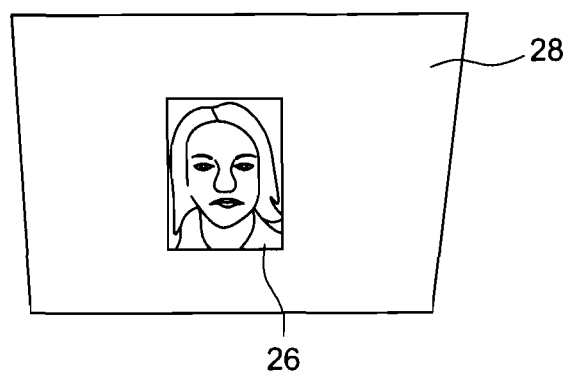
FIG. 4 is a view of the light control film of FIG. 3 at a correct viewing angle for viewing a first security feature formed in the film.

FIG. 4 shows the exact same film as in FIG. 3, but viewed at a first correct viewing angle $\alpha 1$. When viewed at this angle, a first security feature 26 in the form of a portrait image of a person is visible. The first security feature 26 was formed using a laser beam that was deployed at the angle $\alpha 1$ to locally destroy the structures 12 in the film at locations to result in the creation of the portrait image. The areas 28 of the film surrounding the security feature 26 would appear to be dark since the light control structures 12 in the areas 28 remain intact. Although a single portrait image is illustrated and described, a plurality of portrait images can be formed or other security features can be formed with the security feature 26.

Figure 5:
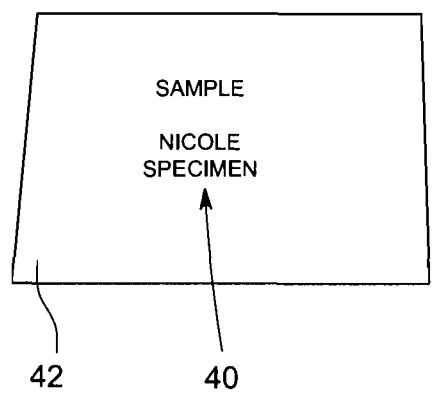
FIG. 5 is a view of the light control film of FIG. 3 at a correct viewing angle for viewing a second security feature formed in the film.

FIG. 5 shows the exact same film as in FIGS. 3 and 4, but viewed at a second correct viewing angle $\alpha 2$ different than the first correct viewing angle $\alpha 1$. When viewed at this second correct viewing angle, a second security feature 40 in the form of text data is visible. The second security feature 40 was formed using a laser beam that was deployed at the second angle $\alpha 2$ to locally destroy the structures 12 in the film at generally the same locations on the film as the first security feature 26. In the illustrated example, one block of text data is illustrated and described corresponding to the portrait image 26 of FIG. 4. However, multiple blocks of text data can be formed or other security feature(s) can be formed as well. Also, the areas 42 of the film surrounding the second security feature 40 appear to be dark since the light control structures 12 in the areas 42 remain intact.

The first angle α1 and the second angle α2 for creating and viewing the security features 26, 40 can be but are not limited to, for example, between about 30 degrees to about 60 degrees respectively. However, larger and smaller angles are possible.

The laser used to create the security feature(s) can be the same type of laser as used in laser personalization processes on cards and passports which are well known in the art. The security feature(s) in the film 10 can be created in generally the same way as laser personalization on cards and passports.

In case of a portrait image in the film 10, the laser locally destroys the structures 12 to create regions of white. The different levels of gray are realized by dithering (changing the density of laser affected spots) of the laser generated image by keeping the same laser power. In another embodiment, different levels of gray in a portrait image in the film 10 can be achieved by using equidistant raster of the laser affected spots but adapting the power of the laser pulses respectively to the desired level of gray.

The security features 26, 40 in FIGS. 4 and 5 are exemplary only. In addition, at each angle α, a single security feature or a plurality of security features can be employed. The security feature(s) at each angle can be the same or different from each other. In addition, in some embodiments, a security feature can be provided at only one angle α.

The security features can be personal to a person, such as some portion or all of the person's image (see FIG. 4), name (see FIG. 5), birth date, social security number, a signature, an address, an assigned account number, any other personal data of the person, and any combination thereof. In another embodiment, the security feature is not personal to a person, but is instead a static feature that is used on multiple films. One example of a static security feature includes, but is not limited to, a corporate logo or corporate name. In another embodiment, the security feature is variable but based on non-personal information, such as the date of creation of the security feature in the film. The film can include any number and combinations of these types of security features, as well as others, such as microtext engraving which are laser engraved elements where magnification tools are needed for discern the microtext letters or other characters.

Figure 6:
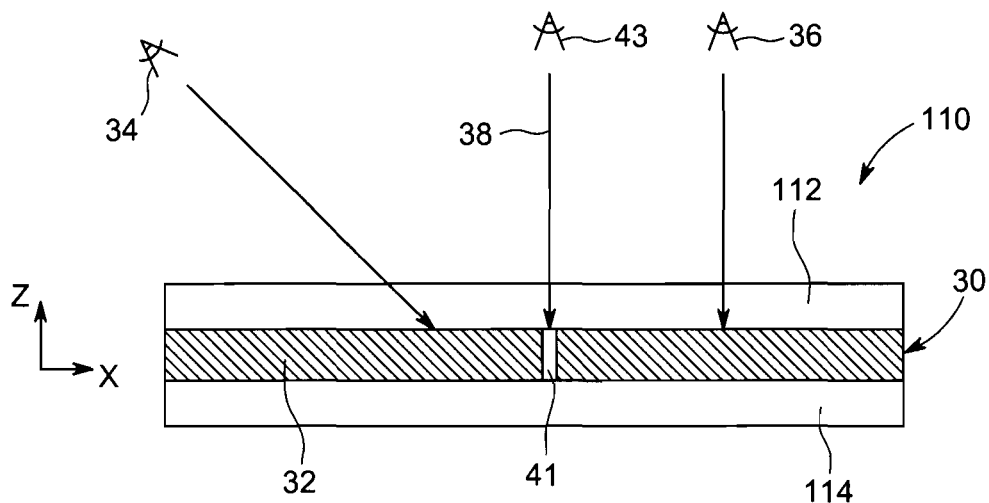
FIG. 6 is a cross-sectional view of another embodiment of the light control film incorporated into an identification document.

With reference to FIG. 6, another embodiment of a light control film 30 is illustrated. In this embodiment, the film 30 includes light control structures 32 that are inclined or angled to the z-axis but are otherwise similar to the light control structures 12. In this embodiment, when the film 30 is viewed along a viewing direction or primary viewing angle 34 the film appears to be generally transparent or translucent. In addition, when the film 30 is viewed along a viewing direction 36 or viewing angle that is perpendicular to the x-y plane of the film, the film appears to be dark.

However, in FIG. 6, a laser beam 38 is deployed to locally change the characteristics of the structures 32 in the film 30 by locally destroying the structures 32 as indicated at the location 41. The security feature is thus visible when the film is viewed along a direction or correct viewing angle 43 that corresponds to the angle at which the laser beam was deployed.

Figure 8:
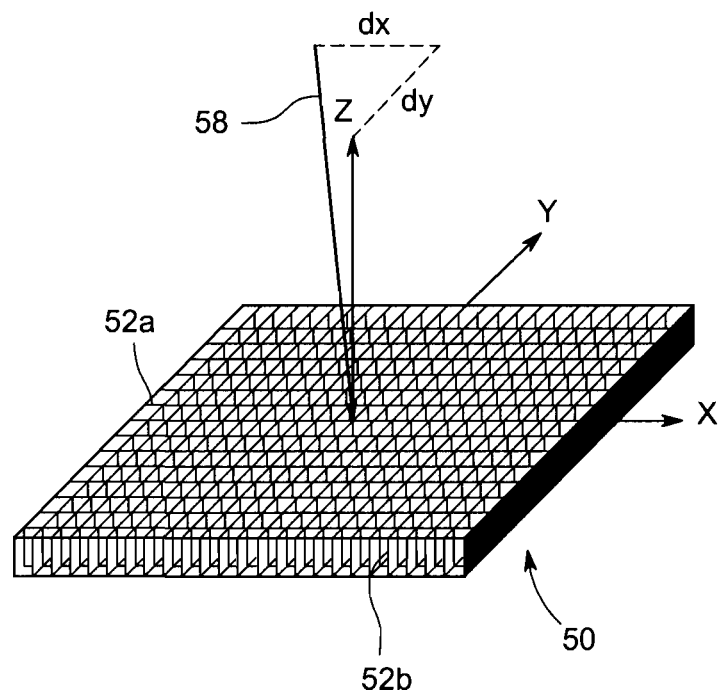
FIG. 8 is a perspective view of another embodiment of a light control film that can be employed.

Other film constructions and laser beam deployment angles can be used. For example, with reference to FIG. 8, a light control film 50 is illustrated that includes light control structures 52a, 52b that extend in the x and y directions and that intersect each other. A laser beam 58 is illustrated that is inclined at an angle to both the x-direction (dx) and the y-direction (dy). A similar beam inclination in the x and y directions could be used for the laser beams 18, 38. Likewise, the light control film 50 could be used with the embodiments described in FIGS. 1-6.

Figure 9:
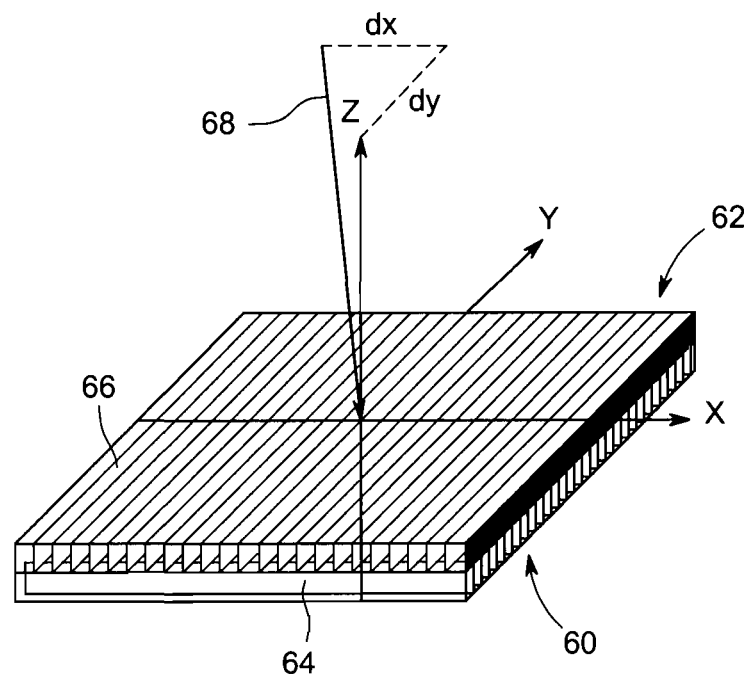
FIG. 9 is a perspective view of another embodiment of a light control film that can be employed.

FIG. 9 illustrates an embodiment where two light control films 60, 62 are stacked on top of one another. The light control film 60 has light control structures 64 similar to the light control structures 12 but extending in the x direction. The light control film 62 has light control structures 66 similar to the light control structures 12 that extend in the y direction. The laser beam 68 can be inclined at an angle to both the x-direction (dx) and the y-direction (dy), or the laser beam 68 can have no (dy) component and extend solely in the x-direction. Likewise, the stacked light control films 60, 62 could be used with the embodiments described in FIGS. 1-6 and 8. This embodiment enables the implementation of at least two security features, which are visible at the appropriate viewing angle, switching the visibility from one security feature to the other one by rotating the two stacked and fixed light control films around the z axis by, for example, 90 degrees.

The light control film with a security feature(s) created therein can be integrated into a document where resistance to counterfeiting and fraudulent alteration are important. Examples of documents that can employ the light control films described herein include, but are not limited to, identification documents such as cards or passports, security documents, stock certificates, property titles, and paper currency. Specific examples of cards include, but are not limited to, national or state identification cards, driver's licenses, health care identification cards, and credit or debit cards.

FIG. 2 illustrates the light control film 10 incorporated into an identification document 100 in the form of a plastic card, such as a national or state identification card, a driver's license, a health care identification card, or a credit or debit card, or a page of a passport. In this example, the film 10 is disposed between a pair of generally transparent or translucent films (or topcoat layers) 102, 104 that overly each side of the film 10 to protect the film 10. In this example, the films 102, 104 substantially cover the entire surfaces of the film 10.

The light control film tested by the inventor had a generally transparent or translucent layer on each side. So even if not incorporated into an identification document, the light control film 10 can have a generally transparent or translucent layer on both sides. However, a light control film without generally transparent or translucent layers is conceivable, with customized transparent or translucent layers being added on the bottom and top of the film.

The film 10 can include one or more security features formed therein as described above. For example, the film can include a portrait image of the intended holder of the document 100 and/or text data relating to the intended holder of the document created therein at different angles α1 and α2 using a laser as discussed above. The security feature(s) formed in the film 10 can match security features formed on the films 102, 104, or on other layers or structures of the document 100. For example, a portrait image security feature formed in the film 10 can match a portrait image of the intended document holder that is formed on the layer 102, the layer 104, or other layer or structure of the document 100.

In the example in FIG. 2, data can be provided on the inner surface of the film 102 and/or on the inner surface of the film 104. Because both films 102, 104 are generally transparent or translucent, the security feature(s) in the film 10 and other data on the films 102, 104 are visible from both sides of the document 100.

Another example of an identification document 110 is illustrated in FIG. 6 where the film 30 is disposed between a pair of generally transparent or translucent films (or topcoat layers) 112, 114 that overly each side of the film 30 to protect the film 30.

Figure 7:
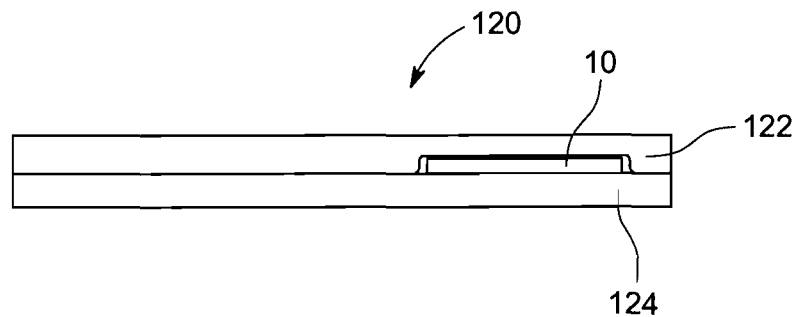
FIG. 7 is a cross-sectional view of another embodiment of an identification document that employs the light control film.

FIG. 7 is a cross-sectional view of another embodiment of an identification document 120 in the form of a plastic card, such as a national or state identification card, a driver's license, a health care identification card, or a credit or debit card, or a page of a passport, into which the light control film 10 (or the films 30, 50, 60) is integrated. In this example, the film 10 is in the form of a patch that is smaller in size than the overlying transparent or translucent films 122, 124.

The patch-size film 10 in FIG. 7 can include one or more security features formed therein as described above. The use of a patch-size film 10 means that any data on the films 122, 124 or otherwise not underlying the film 10 will remain visible at all viewing angles.

In another embodiment, the films 122 and 124 are only transparent or translucent in the area over and/or underlying the area of the light control film 10 and not transparent or translucent in the remaining area.

In another embodiment, one of the films 122 and 124 is not transparent or translucent in the area over or underlying the area of the light control film 10. Therefore the security feature(s) only becomes visible when the film 10 is viewed at the correct viewing angle, from the one side having the film that is transparent or translucent at the area of the light control film 10.

In all embodiments described herein, the portion of the layer(s) underlying or overlaying the light control film does not need to be transparent or translucent. Instead, the overlaying or underlying layer can be opaque.

Figure 10A:
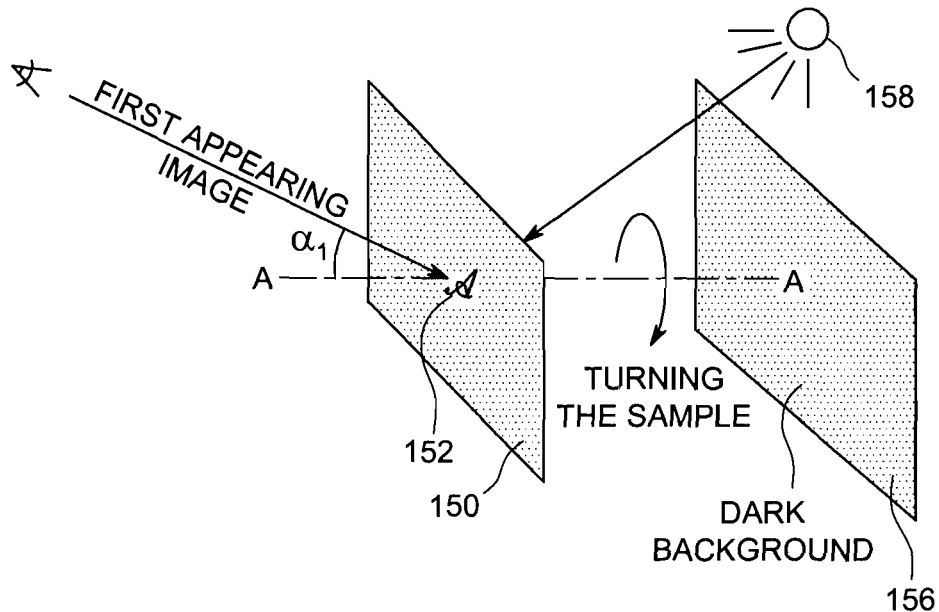
FIGS. 10a and 10b illustrate another embodiment of viewing two security features formed at generally the same area in the light control film.
Figure 10B:
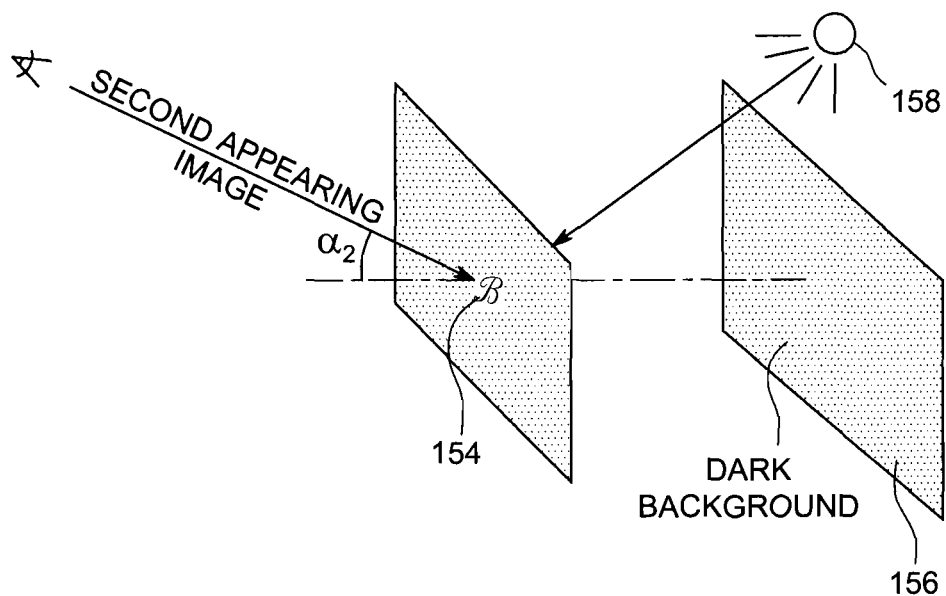

With reference to FIGS. 10a and 10b, another example of viewing two security features formed at generally the same area in a light control film (or transparent identification document) 150 is illustrated. The film 150 includes a first security feature 152 (FIG. 10a) and a second security feature 154 (FIG. 10b) formed therein using a laser as described above. The film 150 is observed in front of a dark background 156, while a light source 158 provides illumination generally on the back side or at an angle to the back side of the film 150. The background 156 is spaced from the film 150 so that there is a gap between the two.

The security feature 152 is visible when the light control film 150 is viewed at the correct viewing angle(s) α1. The film is then rotated about the axis A-A, for example 180 degrees, to the position in FIG. 10b. Once the film is rotated, the security feature 154 is visible when viewed at the correct viewing angle(s) α2.

In the example illustrated in FIGS. 10a and 10b, the viewing angle α1 equals the viewing angle α2. However, the viewing angles α1 and α2 need not be the same. In addition, although the film 150 has been described as being rotated 180 degrees, the film can be rotated other amounts greater or lesser than 180 degrees. For example, if the film 150 is constructed like that described in FIG. 9, the film would be rotated 90 degrees.

Figure 11:
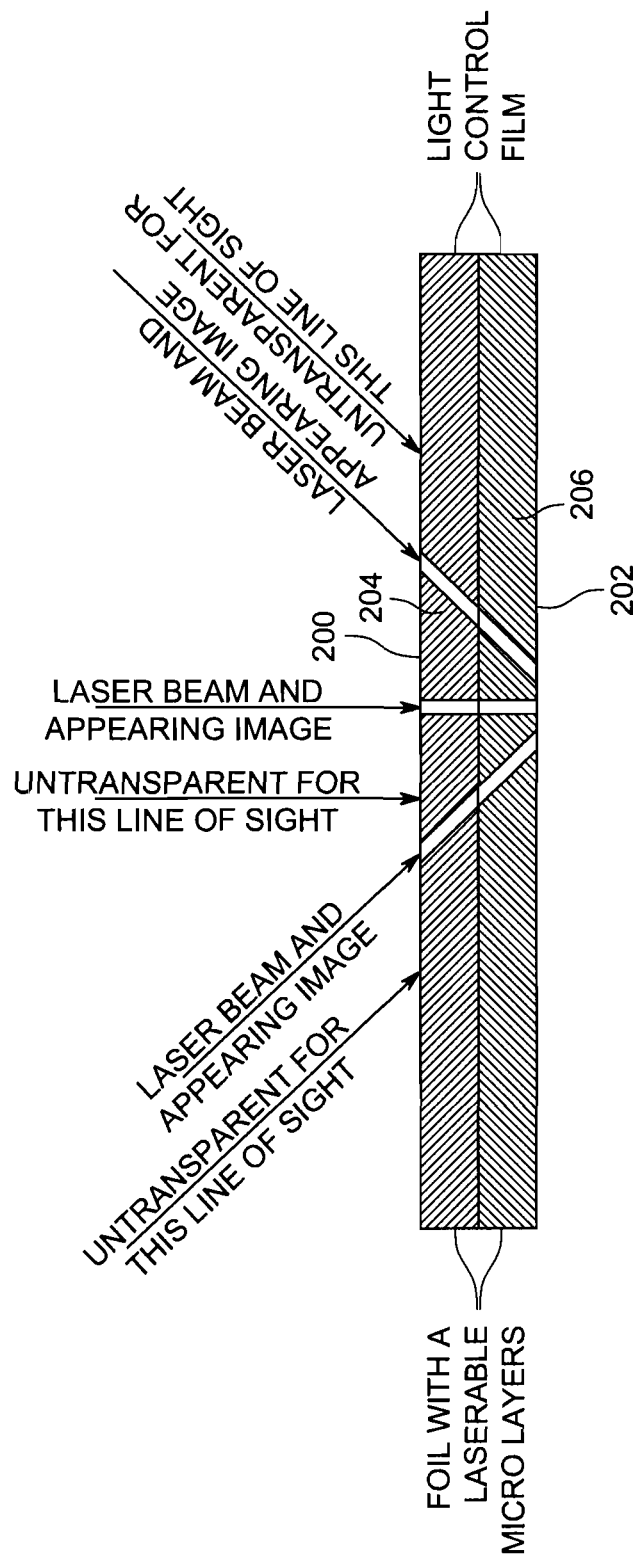
FIG. 11 illustrates an embodiment that employs two layers of light control film.

FIG. 11 illustrates an embodiment where two light control films 200, 202, similar to the film 30 shown in FIG. 6, are stacked on top of each other. The film 200 has light control structures 204 arranged similarly to the light control structures 32 in the film 30 of FIG. 6, while the film 202 has light control structure 206 angled in the opposite direction. The result is a combined structure where each individual light control film by itself is generally transparent or translucent and includes one or more security features as described herein, but the resulting combined structure is not generally transparent or translucent because of the arrangement of the light control structures in each film.

The embodiments disclosed in this application are to be considered in all respects as illustrative and not limitative. The scope of the claimed invention is indicated by any appended claims rather than by the foregoing description, and all changes which come within the meaning and range of equivalency of the claims are intended to be embraced therein.

The invention claimed is:

1. A light control film having a plurality of micro light control structures formed in the film, and a first security feature formed in the micro light control structures, wherein the light control film is generally transparent or translucent at a first viewing angle, the first security feature is not visible when the light control film is viewed at the first viewing angle, and the first security feature is visible when the light control film is viewed at a first correct range of viewing angles, wherein the first security feature is formed in the micro light control structures at an angle that is different than the first viewing angle and wherein the angle is within the first correct range of viewing angles, and a second security feature formed in the micro light control structures, located in generally the same area and/or adjacent to the first security feature, wherein the second security feature is not visible when the light control film is viewed at the first viewing angle or the first correct range of viewing angles, and the second security feature is visible when the light control film is viewed at a second correct range of viewing angles, and wherein the second security feature is formed in the micro light control structures at an angle that is different than the first viewing angle and wherein the angle is within the second correct range of viewing angles.

2. The light control film of claim 1, wherein the plurality of micro light control structures: are parallel to each other, are inclined to a vertical axis, or intersect one another.

3. The light control film of claim 1, wherein the light control film comprises a single layer or first and second layers.

4. A method of creating a security feature in a light control film having a plurality of micro light control structures formed in the film, the light control film being generally transparent or translucent when the light control film is viewed at a first viewing angle, comprising:

using a laser beam to destroy portions of the micro light control structures to form a first security feature; wherein the light control film remains generally transparent or translucent at the first viewing angle, the first security feature is not visible when the light control film is viewed at the first viewing angle, and the first security feature is visible when the light control film is viewed at a first correct range of viewing angles, wherein the laser beam contacts the micro light control structures destroyed thereby at an angle that is different than the first viewing angle, wherein the angle is within the first correct range of viewing angles, and using a laser beam to destroy portions of the micro light control structures to form a second security feature, located in the same area and/or adjacent to the first security feature, wherein the light control film remains generally transparent or translucent at the primary viewing angle, the second security feature is not visible when the light control film is viewed at the first viewing angle or the first correct range of viewing angles, and the second security feature is visible when the light control film is viewed at a second correct range of viewing angles, wherein the laser beam that forms the second security feature contacts the micro light control structures destroyed thereby at an angle that is different than the first viewing angle, and wherein the angle is within the second correct range of viewing angles.

5. The method of claim 4, further comprising orienting the light control film and the laser at a first relative position to one another and forming the first security feature, and thereafter moving the light control film and laser relative to one another to a second relative position to one another and forming a second security feature.

6. The method of claim 5, wherein moving the light control film and the laser relative to one another to the second relative position comprises tilting the light control film and the laser relative to one another from the first relative position to the second relative position or rotating the light control film and the laser relative to one another from the first relative position to the second relative position about an axis vertical to a plane of the light control film.

7. The method of claim 4, wherein the first security feature comprises a portrait image, text data, or a logo, and the second security feature comprises a portrait image, text data, or a logo.

8. The method of claim 4, wherein the light control film comprises a single layer or first and second layers.

9. A document that includes a light control film, the light control film having a plurality of micro light control structures formed in the film, and a first security feature formed in the micro light control structures, the first security feature is not visible when the document and the light control film are viewed at a first viewing angle, and the first security feature is visible when the document and the light control film are viewed at a first correct range of viewing angles, wherein the first security feature is formed in the micro light control structures at an angle that is different than the first viewing angle, and wherein the angle is within the first correct range of viewing angles, and a second security feature formed in the micro light control structures, located in generally the same area and/or adjacent to the first security feature, the second security feature is not visible when the light control film is viewed at the first viewing angle or the first correct range of viewing angles, and the second security feature is visible when the light control film is viewed at a second correct range of viewing angles, and wherein the second security feature is formed in the micro light control structures at an angle that is different than the first viewing angle, and wherein the angle is within the second correct range of viewing angles.

10. The document of claim 9, wherein the document is a plastic card or a passport.

11. The document of claim 10, wherein the document includes a first generally transparent or translucent layer overlying a first side of the light control film, and a generally transparent or translucent layer overlying a second side of the light control film.

12. The document of claim 10, wherein the document includes a first generally transparent or translucent layer overlying a first side of the light control film, and a non-transparent/nontranslucent layer overlying a second side of the light control film.

13. The document of claim 10, wherein the first security feature comprises a portrait image, text data, or a logo, and the second security feature comprises a portrait image, text data, or a logo.

14. The document of claim 9, wherein the document further comprises a second light control film having a second plurality of micro light control structures, wherein the micro light control structures of the light control film and the micro light control structures of the second light control film are disposed at an angle relative to one another so that the visibility of the first security feature and the visibility of the second security feature can be switched by rotating the document around a z-axis.

15. The document of claim 9, wherein the light control film comprises a single layer or first and second layers.

* * * * *